Dec. 29, 1953

H. W. MULCAHY
COMBINED SPRING AND FRICTION
SHOCK ABSORBING MECHANISM 2,664,288

Filed Oct. 7, 1952

Inventor:
Harry W. Mulcahy.
By Henry Fuchs
Atty.

Dec. 29, 1953
H. W. MULCAHY
COMBINED SPRING AND FRICTION
SHOCK ABSORBING MECHANISM
2,664,288
Filed Oct. 7, 1952
2 Sheets-Sheet 2
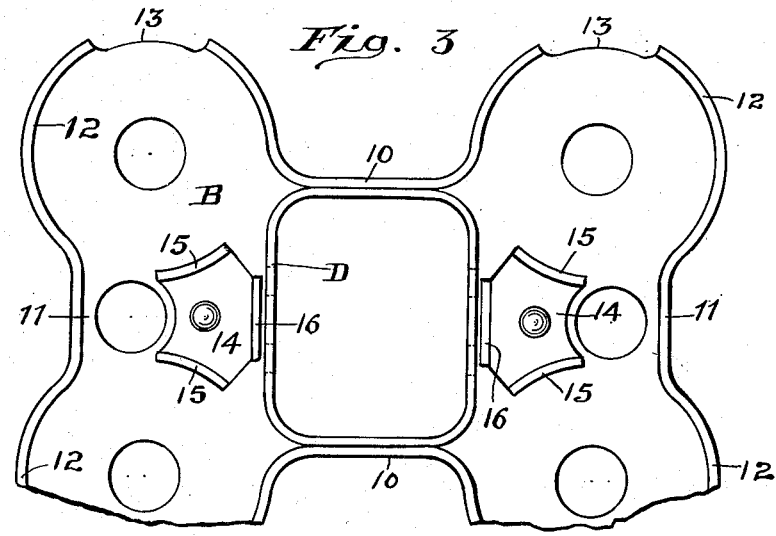
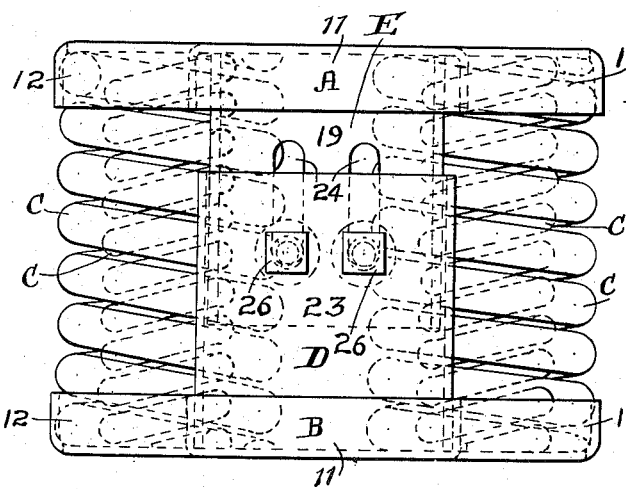
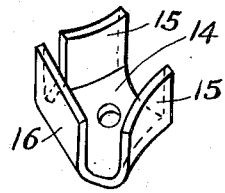
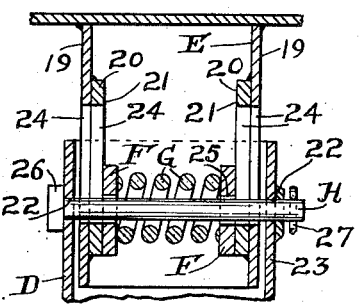
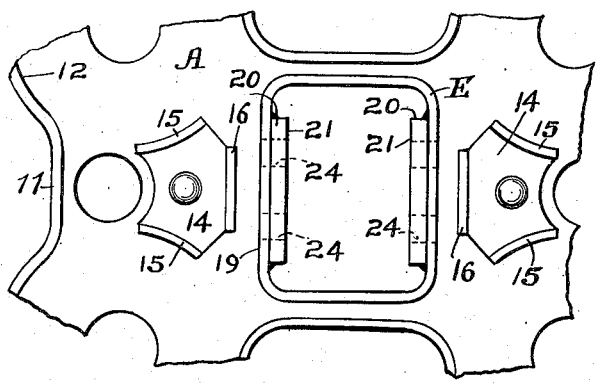
Inventor:
Harry W. Mulcahy.
By Henry Fuchs
Atty.

UNITED STATES PATENT OFFICE 2,664,288

COMBINED SPRING AND FRICTION SHOCK ABSORBING MECHANISM

Harry W. Mulcahy, Chicago, Ill., assignor to W. H. Miner, Inc., Chicago, Ill., a corporation of Delaware Application October 7, 1952, Serial No. 313,473

12 Claims. (Cl. 267—9)

This invention relates to improvements in combined spring and friction shock absorbing mechansims, especially adapted for use in connection with railway car trucks.

One object of the invention is to provide a combined spring and friction shock absorbing mechanism, including top and bottom spring follower plates, a cluster of springs interposed between the follower plates, and simple and efficient means for dampening or snubbing the action of the springs, including cooperating, relatively slidable friction elements operatively connected to the spring follower plates, respectively.

A further object of the invention is to provide a mechanism as set forth in the preceding paragraph, wherein the relatively slidable friction elements comprise a tubular friction casing rigid with one of said spring follower plates, and a set of friction plates in sliding frictional engagement with the interior walls of the casing and fixed with respect to the other spring follower plate, the connection of these friction plates with the last named spring follower being arranged to permit unavoidable relative tilting of the spring follower plates in service, with respect to each other, without disturbing true flat faced engagement between the friction plates and the interior walls of the friction casing associated with the first named spring follower.

A more specific object of the invention is to provide a combined spring and friction shock absorbing mechanism of the character indicated, comprising top and bottom spring follower plates, a cluster of springs interposed between said plates, an upstanding tubular sleeve rigid with said bottom spring follower, a depending friction casing rigid with said top spring follower and loosely engaged within said tubular sleeve, a set of friction plates slidable within said friction casing, said set comprising opposed plates engaged with opposed, interior walls of the friction casing, spring means reacting between said opposed plates to force the same against the walls of the casing, and an operative connection between said plates and sleeve anchoring said plates to the sleeve while permitting vertical movement of the casing with respect to the sleeve.

Other objects of the invention will more clearly appear from the description and claims hereinafter following.

In the accompanying drawings forming a part of this specification, Figure 1 is a top plan view of my improved combined spring and friction shock absorbing mechanism.

Figure 3 is a broken plan view of the bottom spring follower plate of my improved mechanism.

Figure 4 is a side elevational view of Figure 1, looking from left to right in said figure, the left hand pair of springs being omitted to expose the structure at the center of the mechanism.

Figure 5 is a plan view of the underneath side of the top spring follower plate, said view being partly broken away.

Figure 6 is a detail perspective view of one of the spring centering lugs employed on the top and bottom spring follower plates.

Figure 7 is a broken, transverse sectional view, corresponding substantially to the line 7—7 of Figure 1, showing the anchoring pin in elevation.

Figure 1:
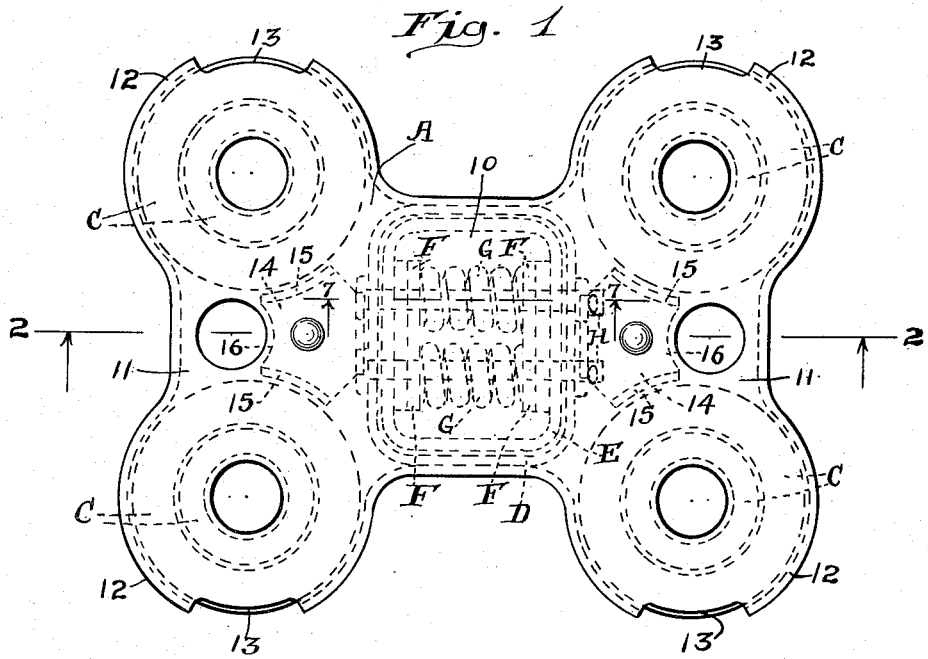
Figure 2:
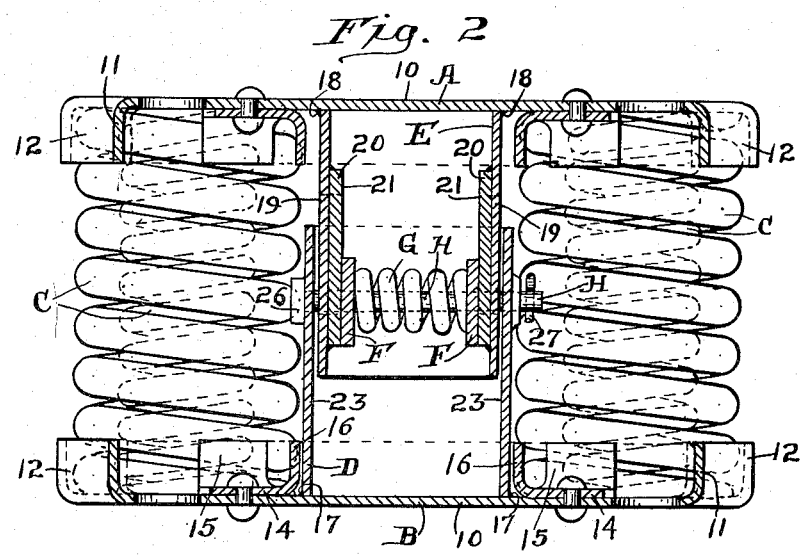
Figure 2 is a transverse vertical sectional view, corresponding substantially to the line 2—2 of Figure 1.

As shown in the drawings, my improved combined spring and friction shock absorbing mechanism comprises broadly top and bottom spring follower plates A and B, four double coil springs C—C—C—C, a tubular sleeve D rigid with the spring follower plate B, a friction casing E rigid with the spring follower plate A and extending into the tubular sleeve D, two friction plates F—F in sliding frictional contact with friction surfaces on the interior of the casing E, a pair of coil springs G—G interposed between the friction plates F—F and pressing the latter against the friction surfaces of the casing, and a pair of pins H—H anchoring the friction plates F—F to the tubular sleeve D and forming means for supporting the springs G—G.

The spring follower plates A and B are of similar design. Each spring follower plate is shaped to support a cluster of four double coil springs C—C—C—C arranged in pairs at opposite sides of the spring follower plates, each double coil spring C comprising an inner helical coil and a surrounding outer helical coil. Each spring follower plate comprises a central portion 10 and side wings 11—11 extending transversely. Each spring plate is further provided with a peripheral flange 12 at right angles to the plane of said plate. The side wings 11—11 present portions of rounded contour to correspond to the outer of said double coil springs C—C and C—C, and the flange 12 of each of said spring follower plates functions as spring centering means. The flange 12 is continuous around each of said plates, except for short distances at the front and rear of the same, where they are interrupted, as indicated at 13—13. In addition, each spring follower plate is provided with a pair of centering

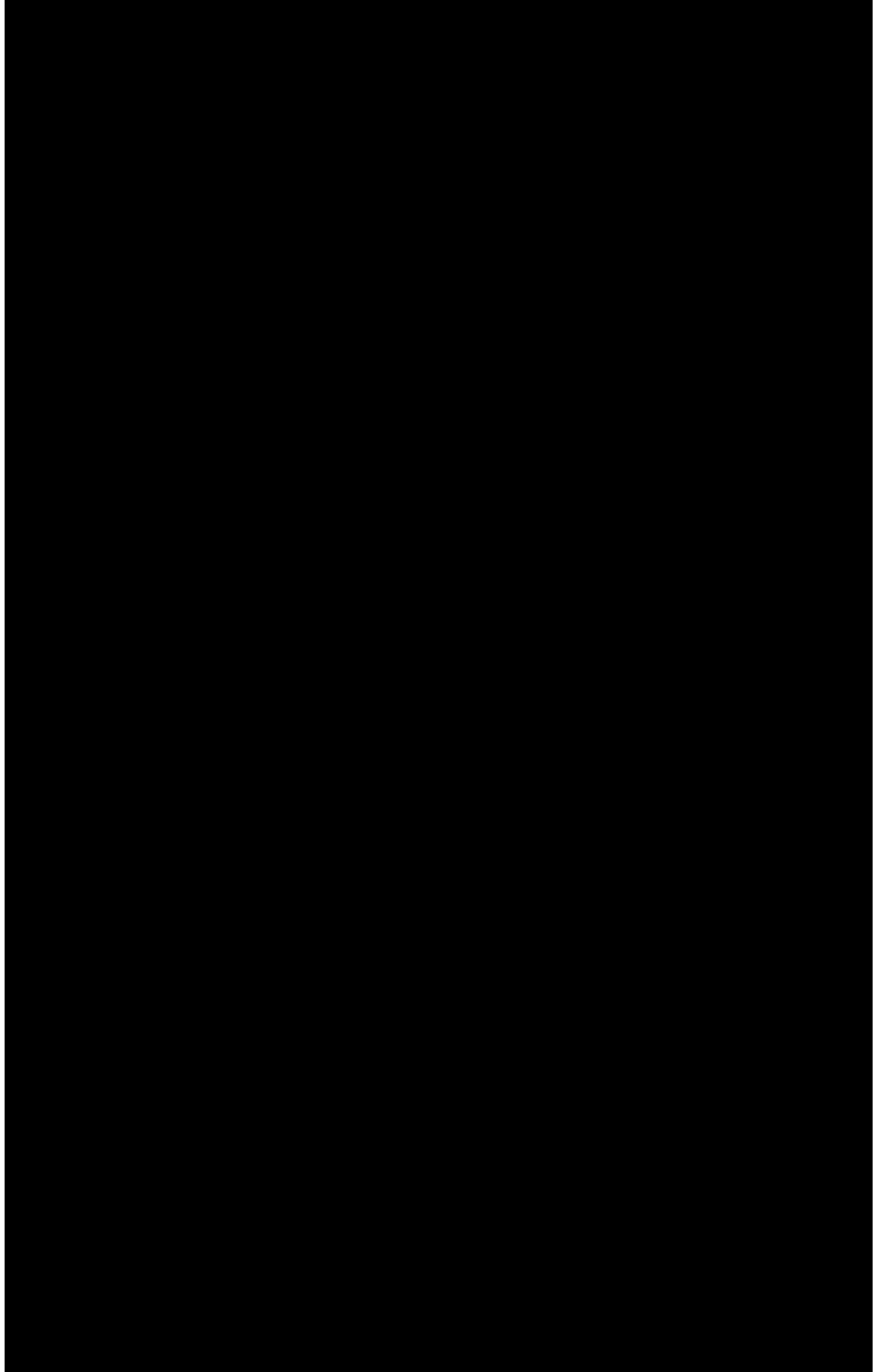

follower at the outer end of said casing, fixed with respect to said casing; friction plates within the casing having sliding frictional engagement with the friction surfaces thereof; resilient means within said casing bearing on said plates for pressing the same against said friction surfaces; a member opposed to said casing; a spring follower at the outer end of said member, rigid therewith, said casing and member being movable toward and away from each other, the walls of said casing having lengthwise extending openings therethrough; means for anchoring said plates to said member against movement lengthwise of the mechanism with respect to said member, said anchoring means extending into the casing through said openings and being fixed to said plates and member, respectively; and springs interposed between and bearing at opposite ends on said spring followers.

4. In a shock absorbing mechanism, the combination with a spring follower having laterally spaced, opposed walls extending therefrom lengthwise of the mechanism, said walls having openings extending therethrough; of a second spring follower having lengthwise extending, laterally spaced, opposed walls extending therefrom, loosely embracing said walls of said first named follower, said followers being relatively movable toward and away from each other lengthwise of the mechanism; friction plates slidable on the inner sides of said walls of said first named follower; resilient means between said plates bearing thereon to hold said plates in tight frictional engagement with said inner sides of said walls of said first named follower; anchoring means engaged through said openings of the walls of said first named follower and fixed to said plates and walls of said second named follower; and springs interposed between and bearing at opposite ends on said followers.

5. In a shock absorbing mechanism, the combination with a casing having opposed walls provided with lengthwise extending, opposed, interior friction surfaces, said casing walls being provided with lengthwise extending slots; of a sleeve, said sleeve and casing being movable toward and away from each other lengthwise of the mechanism, said casing being loosely telescoped within said sleeve; a pair of laterally spaced friction plates within said casing in sliding engagement with the friction surfaces thereof; anchoring means extending through said slots of the casing and fixedly connecting said plates to said sleeve; and spring means interposed between and bearing at opposite ends on said plates.

6. In a shock absorbing mechanism, the combination with a casing having opposed walls provided with lengthwise extending, opposed, interior friction surfaces, said casing walls being provided with lengthwise extending slots; of a sleeve, said sleeve and casing being movable toward and away from each other lengthwise of the mechanism, said casing being loosely telescoped within said sleeve; a pair of laterally spaced friction plates within said casing in sliding engagement with the friction surfaces thereof; an anchoring pin extending through said slots and fixed to said sleeve and plates, respectively; and spring means interposed between and bearing at opposite ends on said plates.

7. In a shock absorbing mechanism, the combination with a casing having opposed walls provided with lengthwise extending, opposed, interior friction surfaces, said casing walls being provided with lengthwise extending slots; of a sleeve, said sleeve and casing being movable toward and away from each other lengthwise of the mechanism, said casing being loosely telescoped within said sleeve; a pair of laterally spaced friction plates within said casing in sliding engagement with the friction surfaces thereof; an anchoring pin extending through said slots of said casing and fixed respectively to said plates and sleeve; and a spring mounted on said pin between said plates and having its opposite ends bearing on said plates.

8. In a shock absorbing mechanism, the combination with a tubular friction casing having opposed walls provided with lengthwise extending, interior friction surfaces, said casing walls having longitudinal slots extending therethrough; a pair of laterally spaced friction plates within said casing, slidingly engaged with said friction surfaces of said casing, said plates having pin receiving openings extending therethrough; a tubular sleeve within which said casing is loosely telescoped for movement lengthwise of said sleeve, said casing and sleeve being movable toward and away from each other lengthwise of the mechanism, said sleeve being provided with aligned opposed pin receiving openings; an anchoring pin operatively connecting the plates to said sleeve, said pin extending through the openings of said sleeve, slots of the casing, and openings of the friction plates; and a spring surrounding said pin between said plates and bearing at opposite ends on said plates.

9. In a shock absorbing mechanism, the combination with a top spring follower; of a bottom spring follower; a depending casing on said top spring follower, said casing having opposed walls provided with lengthwise extending, interior friction surfaces, said casing walls having lengthwise extending slots therein; an upstanding sleeve on said bottom spring follower, said followers being movable toward and away from each other lengthwise of the mechanism, said casing having its lower end loosely telescoped within the upper end of said sleeve; a pair of laterally spaced friction plates within said casing in sliding frictional engagement with said friction surfaces; anchoring means extending through said slots of the casing and connecting said plates to said sleeve to hold the same against relative lengthwise movement; spring means interposed between and bearing at opposite ends on said plates; and springs at opposite sides of the mechanism interposed between and bearing on said top and bottom spring followers.

10. In a shock absorbing mechanism, the combination with a casing having opposed walls provided with lengthwise extending, opposed, interior friction surfaces, said casing walls being provided with lengthwise extending slots; of a spring follower at one end of said casing formed rigid therewith; a sleeve within which the other end of said casing is loosely telescoped, said sleeve and casing being movable toward and away from each other lengthwise of the mechanism; a second spring follower on said sleeve formed rigid therewith, said spring follower being at the end of the sleeve which is remote from the casing; a pair of laterally spaced friction plates within said casing in sliding engagement with the friction surfaces thereof; an anchoring pin extending through said slots of said casing and fixed respectively to said plates and sleeve; a plurality of springs interposed between and bearing at opposite ends on said spring followers; and a coiled spring mounted on said pin between said plates and having its opposite ends bearing on said plates.

11. In a shock absorbing mechanism, the combination with a spring follower; of a second spring follower, said spring followers being movable toward and away from each other; a cluster of springs interposed between said spring followers and bearing at opposite ends thereon; a tubular casing fixed to one of said spring followers and extending toward the other spring follower; a tubular sleeve fixed to said other spring follower and extending toward said casing, said casing having opposed walls provided with lengthwise extending, interior friction surfaces, said casing walls having longitudinal slots extending therethrough; a pair of laterally spaced friction plates within said casing slidingly engaged with said friction surfaces of the casing, said plates having pin receiving openings extending therethrough, said sleeve being provided with aligned opposed pin receiving openings; an anchoring pin operatively connecting said plates to said sleeve, said pin extending through the openings of said slots of the casing and the openings of the friction plates; and a coil spring surrounding said pin between said plates and bearing at opposite ends on said plates.

12. In a shock absorbing mechanism, the combination with a top spring follower; of a bottom spring follower; an upstanding tubular sleeve on said bottom spring follower; a depending tubular friction casing on said top spring follower extending into and loosely telescoped within said sleeve, said casing having interior friction surfaces on opposed walls thereof; a spring cluster interposed between said followers and bearing thereon; opposed friction plates within said casing in sliding frictional engagement with the interior friction surfaces of said casing, each of said opposed walls of the casing having a pair of laterally spaced, lengthwise extending guide slots therein; a pair of pins arranged side by side and extending through said slots of the casing and operatively connecting said plates to said sleeve; and a pair of coil springs between said plates and bearing thereon, said coil springs being mounted on said pins, respectively.

HARRY W. MULCAHY.

References Cited in the file of this patent

UNITED STATES PATENTS

| Number | Name | Date |
|---|---|---|
| 1,437,291 | Corporon | Nov. 28, 1922 |
| 2,366,181 | Cottrell | Jan. 2, 1945 |
| 2,389,840 | Bruce | Nov. 27, 1945 |
| 2,392,725 | Cottrell | Jan. 8, 1946 |